US005951083A

United States Patent [19]

Bittinger et al.

[11] Patent Number: 5,951,083

[45] Date of Patent: Sep. 14, 1999

[54] GLOVE BOX DOOR DAMPER

[75] Inventors: D. Scott Bittinger, Fenton; Fredrick S. Massat, Royal Oak, both of Mich.

[73] Assignee: Chrysler Corporation, Auburn Hills, Mich.

[21] Appl. No.: 08/969,972

[22] Filed: Nov. 13, 1997

[51] Int. Cl.$^{6}$ .......... B60N 3/12

[52] U.S. Cl. .......... 296/37.12; 16/339

[58] Field of Search .......... 296/37.12, 37.9, 296/37.7, 37.8, 37.13; 312/327, 326, 334.12, 334.21, 334.36, 334.42, 334.43; 49/386; 16/339; 188/80, 25

[56] References Cited

U.S. PATENT DOCUMENTS

| | | | |
|---|---|---|---|
| 3,156,324 | 11/1964 | Colbert | 188/80 |
| 4,828,236 | 5/1989 | Inoue | 49/386 X |
| 5,413,317 | 5/1995 | Spoerre | 296/37.8 X |
| 5,522,638 | 6/1996 | Falcoff et al. | 296/37.8 |

*Primary Examiner*—D. Glenn Dayoan
*Assistant Examiner*—Jason Morrow
*Attorney, Agent, or Firm*—Lawerence J. Shurupoff

[57] ABSTRACT

A glove box bin is formed with a shaft upon which an elastic roller is mounted. A track is provided adjacent the bin for engaging the roller with an interference fit. The resilient compression of the roller provides a smooth and stable feel as the glove box is opened.

11 Claims, 2 Drawing Sheets

22 18 10 24 28 12

GLOVE BOX DOOR DAMPER

BACKGROUND OF THE INVENTION

1. Field of the Invention

The present invention relates in general to a damper mechanism for vehicle glove boxes and particularly to a damper provided with an elastic wheel which is compressed as it rolls over a track.

2. Description of Prior Developments

In order to improve the feel of smoothness and quality while opening a glove box door, various damping devices have been employed. Such devices include springs, pistons, cams, cables and numerous other arrangements for slowing the descent of the glove box door as it is opened.

Although these prior damper designs function well, they are often complex and costly and require numerous parts. Accordingly, a need exists for a glove box damper which is simple in design, uses few parts, is inexpensive and readily adaptable to existing glove box configurations.

SUMMARY OF THE INVENTION

The present invention has been developed to fulfill the needs noted above and therefore has an object the provision of a simple, inexpensive damper mechanism for a glove box. Another object is to provide such a damper which is easily adapted for use with existing glove boxes.

An elastic wheel is rotatably mounted to a shaft extending from a wall of the glove box bin. A track is provided adjacent the bin for guiding the movement of the wheel as the glove box is opened and closed. A slight interference is maintained between the wheel and track to compress the wheel so as to smoothly retard its rotation and provide the desired damping force.

DETAILED DESCRIPTION OF THE PREFERRED EMBODIMENT

Figure 1:
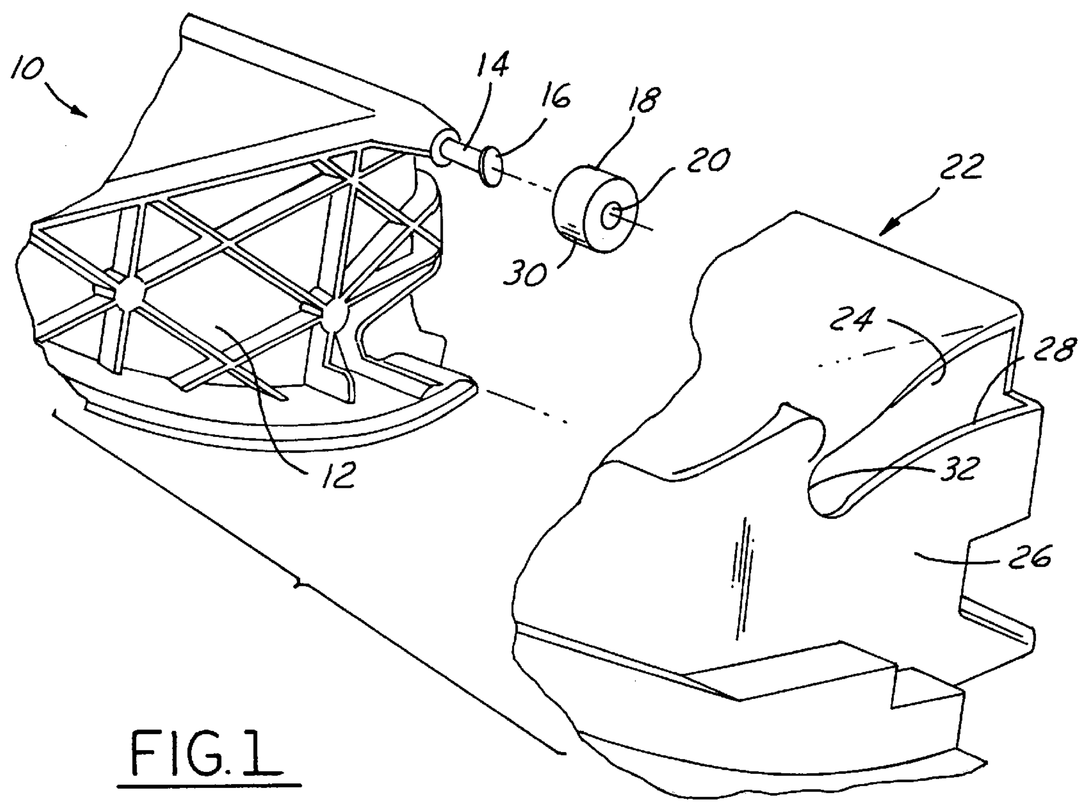
FIG. 1 is an exploded fragmented perspective view of a glove box fitted with a damper in accordance with the invention.

The present invention will now be described in conjunction with the drawings, beginning with FIG. 1 which shows a glove box drawer or bin 10 having a side wall 12 from which a stub shaft 14 extends. A knob or wheel retainer 16 is provided on the free end of cylindrical stub shaft 14.

The bin 10, its side walls including side 12 and stub shaft 14 may be formed as a homogeneous unitary plastic molding using a plastic such as polypropylene. The retainer 16 may also be so molded or secured to the end of shaft 14 in a secondary operation after a wheel is mounted on the shaft.

A wheel or roller 18 is formed with a central bore 20 having a diameter equal to the diameter of the cylindrical stub shaft 14, for example, about 8 mm. Wheel 18 may be cut from a tube of extruded elastomeric material such as a 60 durometer rubber material and mounted on shaft 14 by stretching over knob 16.

A housing 22 surrounds or is disposed adjacent to the bin 10. Housing 22 can be formed from a plastic material such as a blend of polycarbonate and acrylonitrile butadiene styrene (ABS). A curved slot 24 is formed in wall 26 of housing 22 to provide an edge portion defining a curved track 28 over which the wheel 18 may roll. The wheel 18 is aligned with track 28 such that a slight interference of about, for example, 0.5 mm occurs between the rolling surface 30 of wheel 18 and the surface of track 28.

Figure 4:
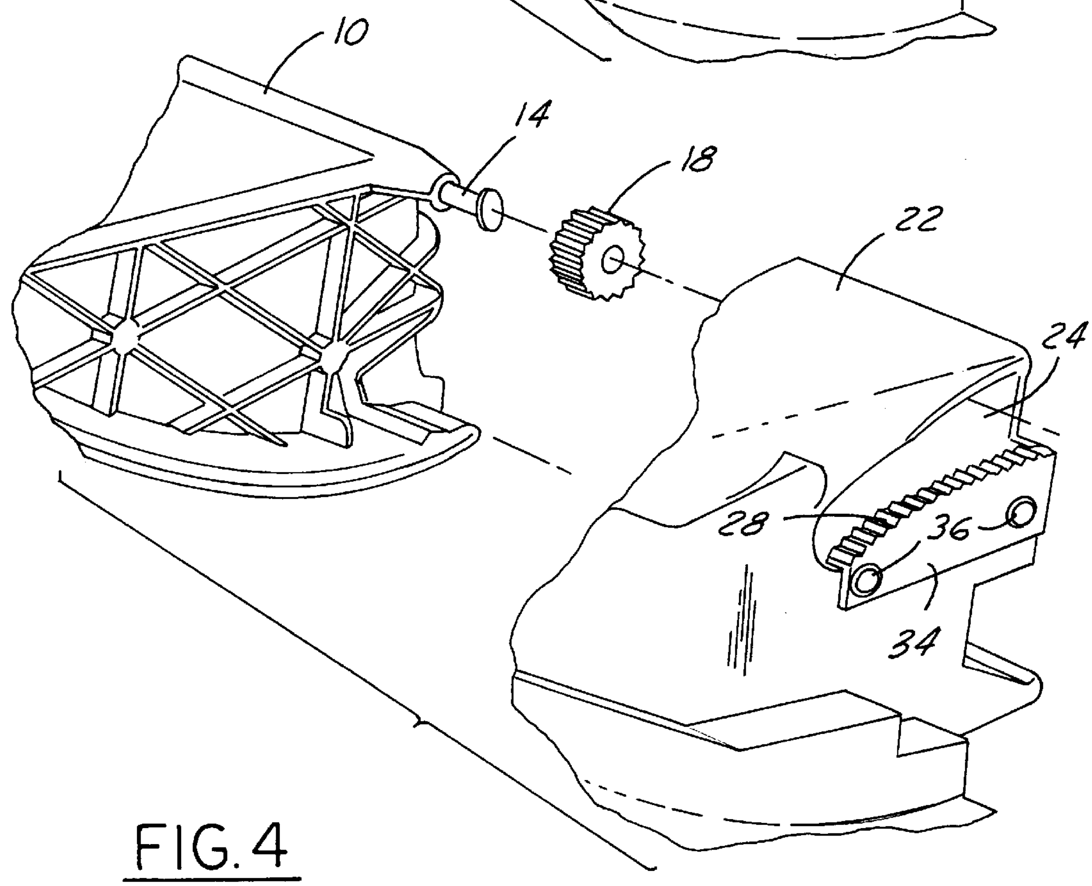
FIG. 4 is a view similar to FIG. 3 showing an adjustable track.

The rate of descent of bin 10 with respect to relatively fixed housing 22 can be adjusted or tuned to virtually any desired rate by increasing or decreasing the amount of interference between the wheel and track. This can be accomplished by varying the diameter of the wheel as well as providing the track on a separate bracket which may be adjustably attached to the side of housing 22 as shown in FIG. 4. The greater the interference, the greater the rolling friction produced between the surface of bore 20 within wheel 18 and the outer cylindrical surface of stub shaft 14.

Figure 2:
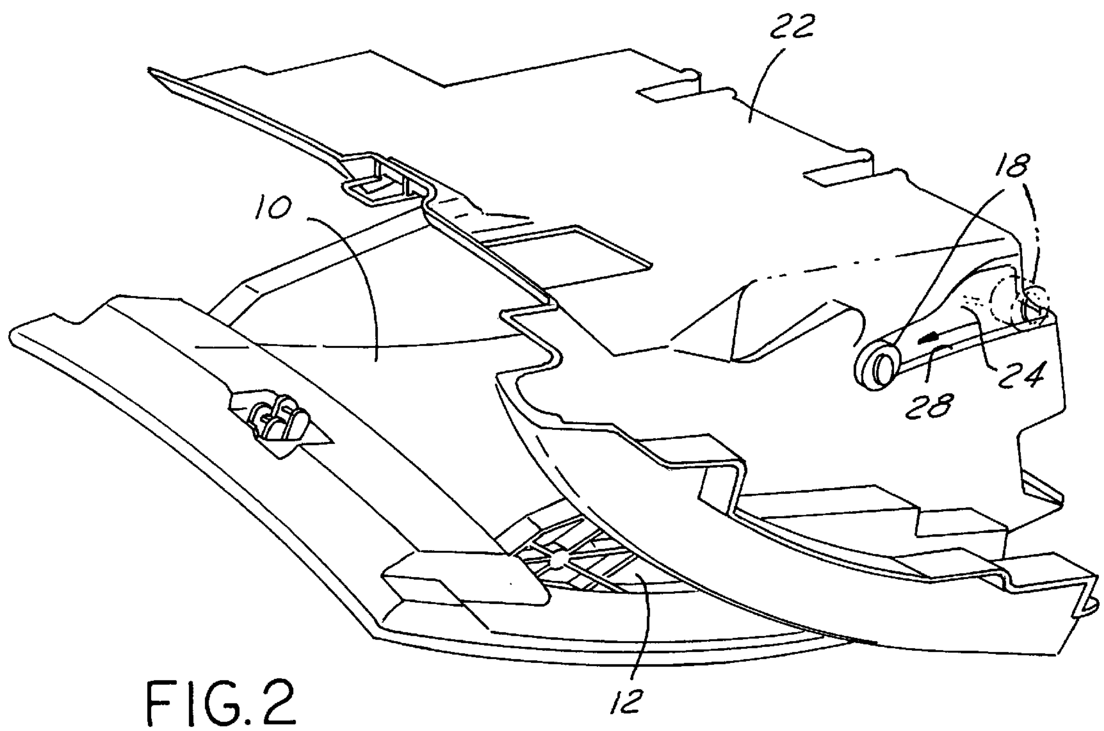
FIG. 2 is a perspective view of the damper of FIG. 1.

As further seen in FIGS. 1 and 2, track 28 is formed with a front end stop or abutment 32 for limiting the pivoting travel motion of bin 10. The upper half or roof of slot 24 is dimensioned to slightly clear the outer diameter of wheel 18 while providing a guide surface during upward or return motions of the bin 10 into housing 22.

The combination of elastic deformation at the interference between the wheel and track and the resulting rolling friction allows the bin to open and descend with a controlled motion thereby giving a passenger operating the glove box a feeling of smooth operation combined with close fitting and accurate quality construction. This operational feel is comparable to that provided by far more expensive damper systems using viscous and spring dampers.

Figure 3:
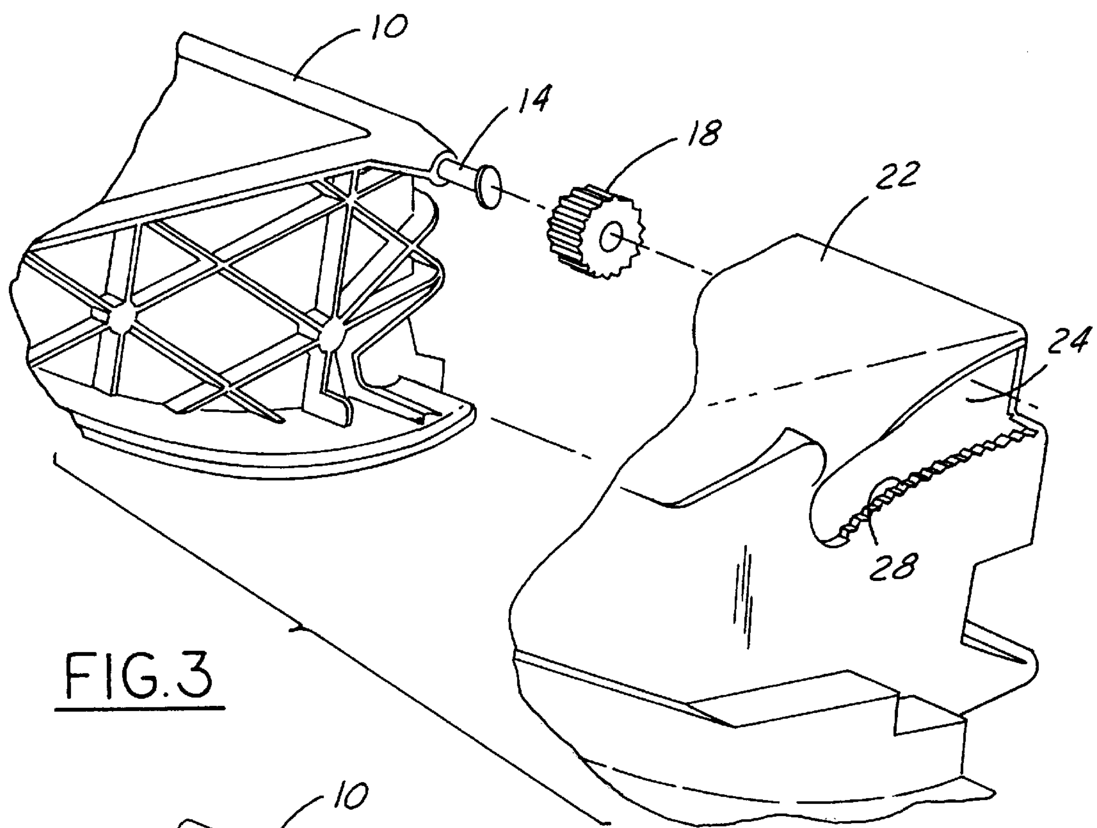
FIG. 3 is a fragmented perspective view of an alternate embodiment of the invention.

FIG. 3 shows an alternate embodiment where the smooth wheel and track is replaced with a toothed elastic wheel and mating toothed track. This arrangement operates the same as that noted above using similar interference between the gear and toothed track. In either embodiment of FIGS. 2 of 3, a single roller and track may be used or a pair of rollers and tracks on opposite sides of the bin may be used for dampening.

A slotted bracket 34, as seen in FIG. 4 may be movably mounted to the side of housing 22 to provide an adjustable track either as shown provided with teeth or as a smooth surfaced track. Bracket 34 may be adjusted up and down as required to provide the desired amount of interference and concomitant damping and secured in position with threaded fasteners 36 which extend through vertical slots in the bracket.

It should be understood that while this invention has been discussed in connection with one particular example, those skilled in the art will appreciate that other modifications can be made without departing from the spirit of this invention after studying the specification, drawings, and the following claims.

We claim:

1. A glove box damper, comprising:

a bin, a shaft provided on said bin;

an elastic roller mounted on said shaft;

a track mounted adjacent said bin; and an elastic rolling interference fit formed between said roller and said track; and a housing provided adjacent said bin and wherein said housing has a slot formed therein having an edge portion defining said track.

2. The damper of claim 1, wherein said bin and said shaft are formed as a homogeneous plastic molding.

3. The damper of claim 2, wherein said plastic molding comprises polypropylene.

4. The damper of claim 1, wherein said elastic roller comprises an extruded rubber material having a durometer of about 60.

5. The damper of claim 1, wherein said shaft comprises a stub shaft having a free end portion and further comprising a wheel retaining knob provided on said free end portion.

6. The damper of claim 1, wherein said track comprises an end stop for limiting movement of said bin.

7. The damper of claim 1, wherein said elastic roller comprises a toothed wheel and wherein said track comprises a toothed track.

8. The damper of claim 1, wherein said rolling interference fit compresses said roller about 0.5 mm.

9. The damper of claim 2, wherein said slot is formed as an arcuate slot having a roof portion extending over said track and wherein said roller is normally spaced apart from said roof portion.

10. The damper of claim 1, further comprising a bracket mounted adjacent said bin and wherein said track is carried by said bracket.

11. The damper of claim 10, wherein said bracket is adjustable for adjusting said interference fit.

* * * * *